United States Patent
Floury et al.

(10) Patent No.: US 10,181,177 B2
(45) Date of Patent: Jan. 15, 2019

(54) METHOD FOR MASKING AN ITEM AMONG A PLURALITY OF ITEMS

(71) Applicant: ORANGE, Paris (FR)

(72) Inventors: Cedric Floury, Perros Guirec (FR); Violaine Mercier, Pleumeur Bodou (FR)

(73) Assignee: Orange, Paris (FR)

( * ) Notice: Subject to any disclaimer, the term of this patent is extended or adjusted under 35 U.S.C. 154(b) by 45 days.

(21) Appl. No.: 14/740,549

(22) Filed: Jun. 16, 2015

(65) Prior Publication Data

US 2015/0371362 A1    Dec. 24, 2015

(30) Foreign Application Priority Data

Jun. 23, 2014  (FR) ...................... 14 55806

(51) Int. Cl.
| | |
|---|---|
| *G06F 3/01* | (2006.01) |
| *G06T 3/00* | (2006.01) |
| *G06F 3/041* | (2006.01) |
| *G06F 3/0488* | (2013.01) |

(52) U.S. Cl.
CPC ............ *G06T 3/0093* (2013.01); *G06F 3/017* (2013.01); *G06F 3/0416* (2013.01); *G06F 3/0488* (2013.01)

(58) Field of Classification Search
CPC ......... G06F 2203/04808; G06F 3/0488; G06F 2221/032; G06F 3/04817
See application file for complete search history.

(56) References Cited

U.S. PATENT DOCUMENTS

| | | | |
|---|---|---|---|
| 8,955,147 B2* | 2/2015 | Lee .................. | G06F 21/74 726/27 |
| 2009/0124379 A1 | 5/2009 | Wells | |
| 2010/0033422 A1 | 2/2010 | Mucignat et al. | |
| 2010/0235793 A1* | 9/2010 | Ording ............... | G06F 1/1626 715/863 |
| 2012/0108336 A1 | 5/2012 | Homer | |
| 2012/0218206 A1* | 8/2012 | Sato .................. | G06F 3/041 345/173 |
| 2013/0346921 A1* | 12/2013 | Shiplacoff ......... | G06F 3/0488 715/835 |
| 2015/0007351 A1* | 1/2015 | Janajri .............. | H04L 63/04 726/30 |
| 2015/0288633 A1* | 10/2015 | Ogundokun ....... | H04L 51/12 709/206 |

* cited by examiner

*Primary Examiner* — Gregory J Tryder
*Assistant Examiner* — Scott E Sonners
(74) *Attorney, Agent, or Firm* — Haverstock & Owens LLP

(57) ABSTRACT

The invention relates to a method for masking an item among a plurality of items displayed on a touchscreen terminal, the method being such that it has, following an action (300) by a user, steps of display (301) of a masking symbol associated with an item at a first location; of detection (302) of contact with the screen on a non-masked item; of continuous movement (303) of the masking symbol on the item in correlation with movement of the contact detected on the screen and of masking of that portion of the item that is situated between the masking symbol and the first location; and of masking (304) of the whole of the item when the masking symbol is at a second location and the contact is no longer detected. The invention likewise relates to a device and a terminal that implement this method.

9 Claims, 4 Drawing Sheets

METHOD FOR MASKING AN ITEM AMONG A PLURALITY OF ITEMS

TECHNICAL FIELD

The invention relates to the field of user interfaces and more particularly concerns a method for masking a piece of information among a set of pieces of information that remain visible.

PRIOR ART

The development of current communication technologies is accompanied every day by new practices. Smart mobile terminals, in particular, have become more democratic and today occupy a central position in the life of their users, rapidly taking them toward new practices. Their users are now contactable at any time on the basis of a whole panel of methods and share all sorts of information with others, as and when they so desire.

Smartphone use takes up a large share of the time of their owners because their use is very varied: internet, communications, diary, reading, photographs, video, television, games, etc. Thus, the smartphone really has to provide a particularly effective interface so that users do not waste time on technical handling and useful information is available immediately.

To limit the number of handling operations and display the largest amount of useful data, terminals often use user interfaces based on lists that the user can scroll through by means of gestures on a touchscreen. An example that may be taken is the classical interface of a list of contacts, sorted in alphabetical order, in which each of the entries leads to a detailed file. Lists of songs, videos, emails or messages are known in this manner. These lists can take the form of a mosaic for images, for example, or conversation bubbles in the case of instant messaging communication, the purpose of such arrangements being to display a plurality of items simultaneously on the screen so as to reduce the number of interactions in order to access them.

It may be noted that, even if a large portion of interpersonal communications go through world digital networks today, and despite the practical and intuitive interfaces with which smartphones are equipped, users still very often share a piece of information by simply showing the screen of their smartphone to a person to whom they are speaking who is present at their side. By way of example, a user is by all means able to select a photograph on his smartphone, display it on the screen and present it to a person to whom he is speaking who is present at his side. In the same way, a user can communicate a telephone number to another person by simply presenting the file for a contact that is stored on his terminal.

This mode of communication is quite evidently very well suited to certain communications, but it has a drawback that can make implementing it tricky. It is that, by means of interfaces based on lists, the information that a user wishes to share is displayed at the same time as other information, likewise displayed on the screen, that he wishes to keep confidential.

In this situation, it is sometimes enough to select a detailed view of the item that one wishes to share so that the other items on the list are no longer visible. By way of example, a user can display a photograph in full screen mode before showing it. However, this technique is not suitable when it is necessary to mask a single item in a list that one wishes to share. A common practice when certain messages in a conversation to be shared need to be masked is to adjust the scrolling of the list so that the messages to be masked do not appear on the screen. Nevertheless, this can prove ineffective in many situations because several messages remain visible simultaneously. It is likewise possible to dictate the message, to conceal a portion of the screen with a hand, to copy/paste into other applications, but circumstances do not always allow this and the handling that is required can be discouraging.

Some messaging or photograph interfaces provide the option of securing access to some content, for example using a password system. A user can then arrange for a conversation not to appear among other conversations. On the other hand, this method involves additional handling that is often discouraging and that prohibits any spontaneity in an exchange.

It may be noted that these handling operations based on the aforementioned existing techniques increase the time spent by users on their terminals, which accordingly reduces the standby time thereof.

There is therefore quite a need for a solution that allows the masking of some items among other items displayed on a screen that is intuitive and requires minimum interaction.

SUMMARY OF THE INVENTION

To this end, the invention concerns a method for masking an item among a plurality of items displayed on a touchscreen terminal, the method being such that it has, following an action by a user, steps of display of a masking symbol associated with an item at a first location; of detection of contact with the screen on a non-masked item; of continuous movement of the masking symbol on the item in correlation with movement of the contact detected on the screen and of masking of that portion of the item that is situated between the masking symbol and the first location; and of masking of the whole of the item when the masking symbol is at a second location and the contact is no longer detected.

The masking symbol associated with the items is a visual indication for the user about the possibility of changing the appearance of a particular item among others, for example of masking an item in a list of items that is displayed on a screen. When the user moves the visual indication, the associated item is progressively masked in a manner correlated with the movement. The item is totally masked when the visual indication reaches a predetermined position and contact with the screen ceases. In this way, a user can rapidly mask, with a single gesture, some information that he does not wish to disclose when he presents the screen of his terminal to a third person. The progressive aspect of the masking operation provides the opportunity for the user to change his mind before complete masking. Thus, the method allows some items among other items displayed on a screen to be masked intuitively with a minimum of interaction. Since interactions with the terminal are limited, this allows the time spent performing handling operations to be reduced and therefore power consumption to be limited, thus increasing the standby time thereof.

According to one particular embodiment, the method for masking is such that the masking of an item involves blurring this item so as to render it illegible.

Since an item has been blurred, this allows characteristic forms of the item to be preserved while preventing comprehension thereof by a third party. By way of example, in the case of a list of messages, applying a blurring effect allows the message to be rendered unintelligible while preserving the forms and proportions of the text. This embodiment is particularly advantageous when a plurality of items are masked, for example, the user thus being able to distinguish a photograph or a message among others without it being comprehensible to a third party.

In one particular embodiment, the method for masking is such that the movement of the masking symbol is a translation according to a dimension of the item to be masked.

The movement of the visual indication on the item is made according to one of its dimensions. By way of example, in the case of a list of messages, an item can be masked according to the width of the message as displayed on the screen. By way of example, if the visual indication is initially positioned to the right of the message, it can be moved until it reaches the extreme left of the message. In the course of the translation from right to left, the masking effect is applied between the initial position and the current position of the visual indication. These kinematics are particularly ergonomic because they are analogous to a curtain that is drawn in order to protect oneself from another, which increases its potential for adoption by users.

According to one particular embodiment, the method for masking is such that the masking symbol is a closed padlock.

The masking symbol is thus a visual indication that is characteristic of the associated function. The ergonomics and intuitiveness of the method are improved thereby.

According to one particular embodiment, the method for masking is such that the items are messages in a list of messages.

The method thus allows the masking of some confidential messages within an instant messaging conversation, for example.

In one particular embodiment, the method for masking is such that it additionally has a step of restoration of the display when the terminal is shaken for a predetermined period.

When one or more items are masked, the method thus allows the restoration of the initial display by simply shaking the terminal. It is thus a particularly simple matter to restore the display after having shared a piece of information. This embodiment likewise has the advantage of making it difficult to restore the display discretely if a third party decides he wishes to look at the masked data.

According to one particular embodiment, the method is such that it additionally has a step of restoration of the display by continuous movement of an unmasking symbol in correlation with movement of contact detected on the screen from the second location to the first location.

The display of a masked item beforehand can be restored by means of a gesture that is symmetrical with respect to the gesture used for masking. It can thus easily be memorized by a user of the terminal.

According to one particular embodiment, the method for masking is such that when contact is detected simultaneously on masking symbols associated with items situated on either side of an item that is to be protected among a plurality of items, the steps of movement of the masking symbol and of masking of the whole of the item are applied to all the items except the item that is to be protected.

The method thus allows very simple masking of all items except for one. A user can then use a single gesture to share a particular message with a person to whom he is speaking without revealing the rest of the conversation.

The invention likewise concerns a device for masking an item among a plurality of items displayed on a touchscreen terminal, the device being such that it comprises modules for:

detection of a user action, display of a masking symbol associated with an item at a first location, detection of contact with the screen on a non-masked item, continuous movement of the masking symbol on the item in correlation with movement of the contact detected on the screen, masking of the portion of the item situated between the masking symbol and the first location, and masking of the whole of the item when the masking symbol is at a second location and the contact is no longer detected.

The invention also concerns a terminal comprising a device for masking as described above.

According to another aspect, the invention concerns a computer program having the instructions for executing the method for masking described above when the program is executed by a processor.

Finally, a final aspect of the invention relates to a computer-readable recording medium on which is recorded a computer program comprising instructions for executing the steps of the method for masking as described above.

The terminals, devices, programs and recording media have advantages similar to those of the corresponding method described above.

LIST OF FIGURES

Other features and advantages of the invention will become more clearly apparent upon reading the description that follows for a particular embodiment, given by way of simple illustrative and nonlimiting example, and the appended drawings, in which.

DESCRIPTION OF A PARTICULAR EMBODIMENT

Figure 1A:
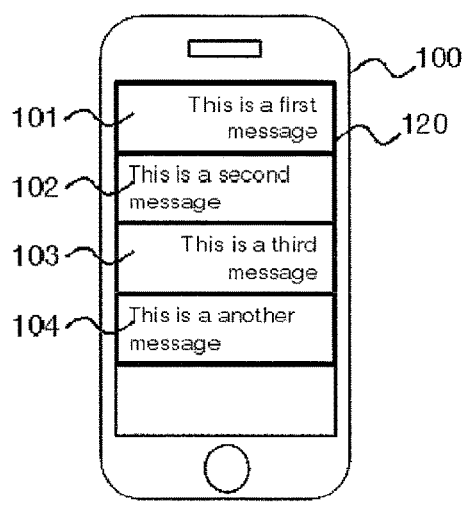
FIGS. 1a, 1b, 1c and 1d show various displays on a portable terminal suited to implementing the method for masking, according to a particular embodiment of the invention.

FIG. 1a illustrates a terminal 100 implementing the method according to the present invention. By way of example, this is a mobile terminal of smartphone type equipped with a touchscreen. The terminal 100 is suited to displaying on the touchscreen a list 120 of messages exchanged between the owner of the terminal and one or more person(s) to whom he is speaking. By way of example, an instant messaging or SMS (Short Message Service) conversation may be involved. By way of example, the terminal 100 displays the last 4 messages received 101, 102, 103 and 104.

This is an opportune juncture at which to remember that this example is given purely by way of illustration in order to help understand the invention according to a particular embodiment. This example is of course nonlimiting, the invention being able to be applied to all sorts of information displayed on a screen simultaneously, such as a mosaic of images, a list of contacts or else application icons.

Figure 1B:
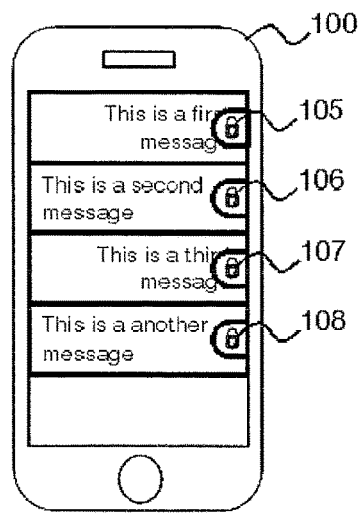

FIG. 1b shows the screen of the same terminal 100 following an action by the user. In particular, it is possible to see masking symbols 105, 106, 107 and 108 respectively associated with the messages 101, 102, 103 and 104 that are displayed by the terminal following an action by the user. By way of example, the user may have touched a particular button on the terminal or on the graphical interface of an application, or else may have made a particular gesture on the touchscreen of the terminal. According to one particular embodiment, a masking symbol is displayed on a particular message when the user touches the screen at the location of this message or when he selects it in another way (for example by means of a pointer, when the terminal is a personal computer).

According to this particular embodiment, the masking symbol is a visual indication representing a closed padlock positioned on the right of the item. According to one particular embodiment, the visual indication may be different or may not be present at all. The visual indication may be semitransparent or in the background in relation to the text so as not to hamper reading of the message.

Figure 1C:
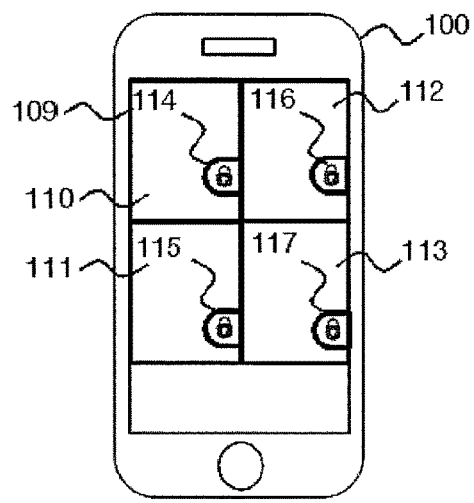

FIG. 1c illustrates a particular embodiment in which a mosaic 109 of images is displayed on the screen of the terminal. Masking symbols 114, 115, 116 and 117 are displayed in association with the corresponding images 109, 111, 112 and 113.

Figure 1D:
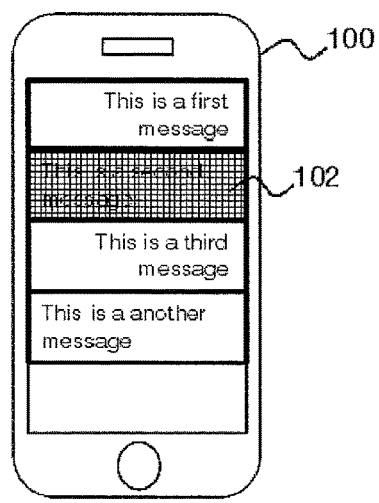

FIG. 1d shows the terminal 100 following complete masking of the item 102. According to one particular embodiment, the masking deforms the visual appearance of the information so as to render it unintelligible while preserving characteristics that can allow the holder to distinguish it among others. According to a preferred embodiment, the masking involves blurring the masked item, for example by applying Gaussian blurring to the area in question. Masking can likewise involve a pixelation effect, or else modification of the characters according to an encryption algorithm. According to one particular embodiment, the masking is opaque and does not allow the masked item to be discerned.

Figure 2A:
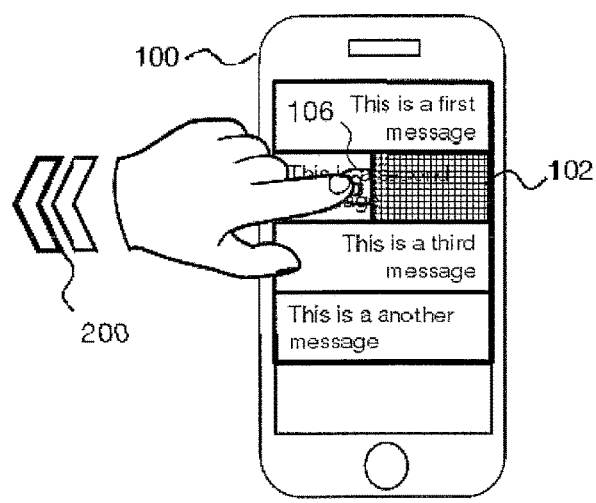
FIGS. 2a and 2b illustrate the step of movement of the masking symbol according to two embodiments of the invention.

FIG. 2a shows the terminal 100 when a user moves his finger over the touchscreen following contact at the location of the masking symbol 106 associated with the message 102. In this example, the user moves his finger over the screen in a direction 200, continuously, from the initial location of the masking symbol 106 as shown in FIG. 1b. The terminal can detect the contact on the masking symbol and the movement of the contact by virtue of its touchscreen. The masking symbol 106 is moved on the message 102 in correlation with the movement of the finger detected on the screen. According to one particular embodiment, the movement of the masking symbol is a translation according to a dimension of the message. By way of example, in FIG. 2a, the symbol makes a translation from right to left according to the width of the message. According to another example, the translation can be made according to the height of the item.

In the course of this movement, that portion of the message 102 that is situated between the current position of the masking symbol and its initial position is masked, the masked area being updated continuously on the basis of the movements of the detected contact on the screen. Thus, still with reference to FIG. 2a, the masked portion of the message grows when the user moves his finger in the direction 200 and shrinks when he moves his finger in the opposite direction.

According to one particular embodiment, when contact with the screen ceases and the masking symbol is at a predefined location, the message is masked completely. By way of example, when the finger of the user in FIG. 1a reaches the left end of the message 102 and contact ceases, the terminal applies masking to the whole of the message. In another example, when the finger of the user reaches the halfway point in the length of the item, the terminal applies the masking to the whole of the message. According to one particular embodiment, the masked item may no longer appear on the screen when it is completely masked, thus allowing the very existence of the message to be concealed from a third party.

According to one particular embodiment, when contact with the screen ceases while the masking symbol is not displayed at a predetermined location, for example when it is not displayed on the extreme left of the message 102 or when it has not gone past the halfway point of the message, the masking symbol automatically returns to its initial position by making a translation in the opposite direction to the direction 102. The method thus allows the user to change his mind before having masked the item. According to one particular embodiment, a special acceleration curve is applied to the movement of the masking symbol toward its initial position, such as an exponential acceleration curve.

Figure 2B:
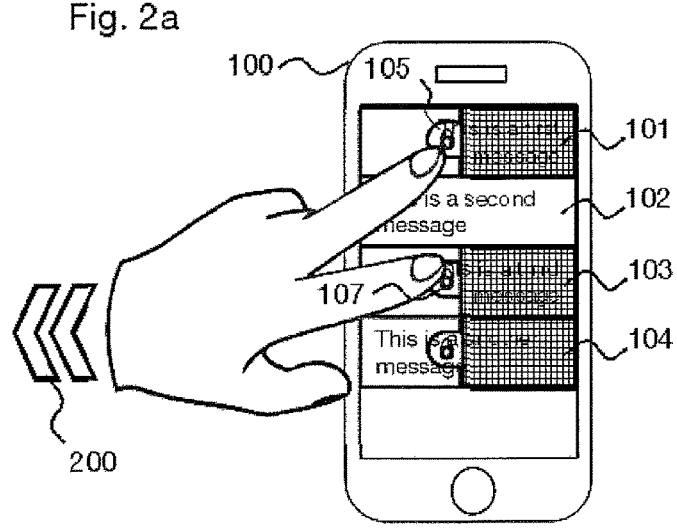

FIG. 2b illustrates a particular embodiment in which the user makes simultaneous contact, on the terminal 100, with two masking symbols 105 and 107 that are respectively associated with the messages 101 and 103. This gesture has the unusual feature that it allows, in accordance with the invention, the inserted message 102 to be denoted as a message to be protected from masking. In this way, the user can control the masking of all messages in the list 120 except for the one denoted in this manner. Contacts are detected by the terminal by virtue of a touchscreen suited to detecting simultaneous multiple contacts. When, while maintaining contact with the screen, the user makes a gesture in the direction 200, the masking symbols 105, 107 and 108 respectively associated with the messages 101, 103 and 104 are moved simultaneously according to the principle described above and the corresponding portion of the messages with which they are associated is masked. In this way, when a user wishes to show a single message during a conversation, he can use a simple gesture to obtain the desired confidentiality.

According to one particular embodiment, the method additionally has a step of restoration of the display when the terminal is shaken for a predetermined period. In this case, all or some of the masked items can be restored simultaneously. By way of example, the terminal can use sensors of accelerometer and/or gyroscope type that are associated with a clock in order to detect shakes applied to the terminal for a predetermined period. This embodiment is advantageous because it allows the user to rapidly restore the display after having used it to present a piece of information to a third party. Another advantage is that the display can be difficult to restore discreetly. This means that if the third party comes to shake the terminal himself in order to look at masked items, the owner of the terminal can see this and intervene if he is present.

According to one particular embodiment, the display is restored in symmetrical fashion with respect to the masking. By way of example, the method for masking may additionally have, following an action by the user when items are masked, steps of display, at the second predetermined location, of an unmasking symbol associated with a masked item; of detection of contact with the screen on a masked item; of continuous movement of the unmasking symbol on the item in correlation with movement of the contact detected on the screen and of unmasking of that portion of the item that is situated between the unmasking symbol and the second predetermined location; and of unmasking of the whole of the item when the unmasking symbol is at the first predetermined location and the contact is no longer detected.

In one particular embodiment of the invention, the items remain masked for a predetermined period of time. By way of example, the display can be restored automatically after 30 seconds or after any previously configured period.

Figure 3:
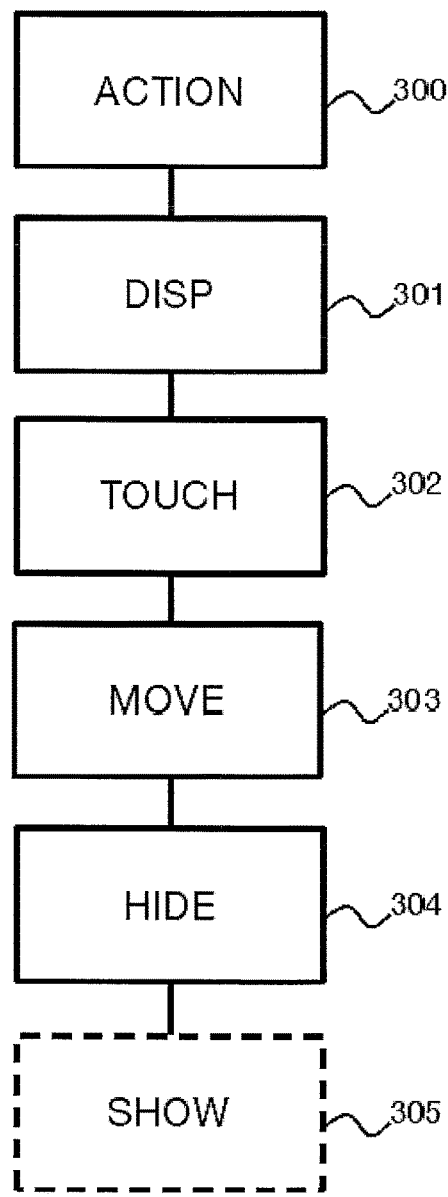
FIG. 3 illustrates the main steps of the method for masking according to a particular embodiment of the invention.

FIG. 3 illustrates the main steps of the method for masking.

A first step 300 involves detection, by the terminal, of a predetermined action performed by a user. By way of example, this may be pushing a physical button on the terminal or a button represented on a touchscreen, or may be a particular gesture on the screen, such as the selection of an item from a list.

When the action is detected, the terminal displays, in step 301, at least one masking symbol in association with at least one item displayed on the screen, the at least one symbol being displayed at a predetermined location. By way of example, in FIG. 1b, the symbols are displayed for each message in the list, on the right. The symbol shown in this figure is a closed padlock, but any other symbol can of course be used.

Contact on the screen is detected in step 302 on at least one symbol. By way of example, the user places a finger on the screen at the location of the symbol 106 shown in FIG. 1b. He can also place different fingers simultaneously on different masking symbols as illustrated in FIG. 2b.

Step 303 concerns continuous movement of the masking symbol on the item in correlation with movement of the contact detected on the screen and masking of that portion of the item that is situated between the masking symbol and the first predetermined location. Thus, as described above with reference to FIG. 2a, the masking symbol moves in correlation with the movement of the contact. That portion of the message that is situated between the current position of the masking symbol and its initial position is masked, the masked portion being updated continuously on the basis of the movement of the contact.

In step 304, the whole of the item is masked when the masking symbol is at a second predetermined location and the contact is no longer detected. By way of example, when the user has moved his finger to the left end of the message 102 in FIG. 2a and he removes his finger, the message is masked completely, as we have seen above.

According to one particular embodiment, the method additionally has an optional step 305 of restoration of the display when the terminal is shaken for a predetermined period. By way of example, when the terminal 100 in FIG. 1d is shaken for a certain period, the display again displays a screen as shown in either of FIGS. 1a and 1b.

Figure 4:
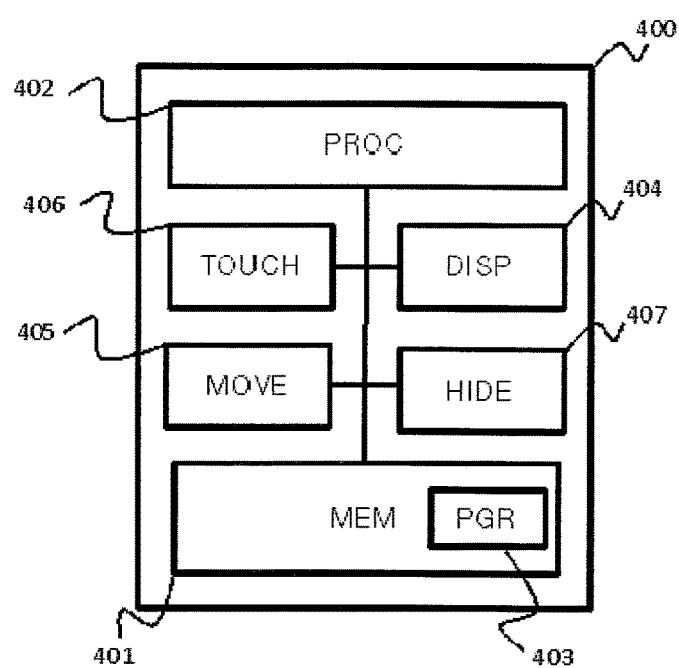
FIG. 4 illustrates the architecture of a device suited to implementing the method for masking according to a particular embodiment of the invention.

FIG. 4 illustrates a device 400 implementing the method for masking, according to a particular embodiment of the invention. The device comprises a storage space 401, for example a memory MEM, a processing unit 402, for example equipped with a processor PROC. The processing unit can be controlled by a program 403, for example a computer program PGR, implementing the method for masking as described in the invention with reference to FIGS. 1a, 1b, 1c, 1d, 2a, 2b and 3, and notably the steps of display of a masking symbol associated with an item at a first predetermined location, of detection of contact with the screen on a non-masked item, of continuous movement of the masking symbol on the item in correlation with movement of the contact detected on the screen and of masking of that portion of the item that is situated between the masking symbol and the first predetermined location, and of masking of the whole of the item when the masking symbol is at a second predetermined location and the contact is no longer detected.

On initialization, the instructions of the computer program 403 are loaded into a memory RAM (Random Access Memory) before being executed by the processor of the processing unit 402, for example. The processor of the processing unit 402 implements the steps of the method for masking according to the instructions of the computer program 403.

For this, the device comprises, apart from the memory 401, a display unit 404, such as a touchscreen DISP suited to displaying a masking symbol associated with an item at a first predetermined location. The device additionally comprises a module 405 for moving graphical objects in correlation with locations detected on the screen, which is suited to implementing the step of continuous movement of the masking symbol on the item in correlation with movement of the contact detected on the screen. By way of example, this may be a circuit allowing the contact data collected from a touchscreen to be coupled to the position of a graphical object on the screen. The device likewise has a module 406 for detecting a user action and for detecting contact with the screen on a non-masked item. By way of example, it may be a button suited to capturing an action or may be a touchscreen. The device also comprises a module (407) for masking that portion of the item that is situated between the masking symbol and the first predetermined location, and for masking the whole of the item when the masking symbol is at a second predetermined location and the contact is no longer detected.

According to one particular embodiment, the device may be integrated in a mobile terminal of smartphone type, a touch tablet, a camera, a personal computer or else a vehicle onboard computer.

The invention claimed is:

1. A method for masking at least a message among a plurality of messages displayed on a screen of a touchscreen terminal, the method comprising, following detection of an action on the screen of the touchscreen terminal, the following acts:
   displaying, on the screen of the terminal, a first masking symbol associated with a first message at a first location, and a second masking symbol associated with a second message at a second location, the second masking symbol being distinct from the first masking symbol, the first and second messages being situated one on each side of at least a third message,
   detecting, by the terminal, simultaneous contacts on the screen at the location of the first masking symbol and at the location of the second masking symbol,
   wherein moving continuously the masking symbols on the first and the second messages in correlation with simultaneous movement of the contacts detected on the screen causes the terminal to perform, for the first message, the second message and at least a fourth message distinct from the at least third message, masking of that portion of the message that is situated between its respective masking symbol and the first location, and further causing the masking of the whole of the message when the respective masking symbol is at a second location and contacts are no longer detected.

2. The method as claimed in claim 1, wherein the masking involves blurring the message so as to render it illegible.

3. The method as claimed in claim 1, wherein the movement of the masking symbol is a translation according to a dimension of the message to be masked.

4. The method as claimed in claim 1, wherein the masking symbol is a closed padlock.

5. The method as claimed in claim 1, wherein the method further comprises an act of restoring the display when the terminal is shaken for a predetermined period.

6. The method as claimed in claim 1, further comprising restoring the display by continuous movement of an unmasking symbol in correlation with movement of contact detected on the screen from the respective second location to the location associated with the respective initial location of the first or second masking symbol.

7. A device for masking an item among a plurality of items displayed on a touchscreen of the device, wherein the device comprises:
- a non-transitory computer-readable memory comprising program code instructions stored thereon;
- a processor configured by instructions to perform acts comprising
- detecting a user action,
- displaying, on the touchscreen of the device, a first masking symbol associated with a first message at a first location, and a second masking symbol associated with a second message at a second location, the second masking symbol being distinct from the first masking symbol, the first and second messages being situated one on each side of at least a third message,
- detecting simultaneous contacts on the touchscreen at the location of the first masking symbol and at the location of the second masking symbol, and
- moving continuously the masking symbols on the first and the second item messages in correlation with simultaneous movement of the contact detected on the screen and, for the first message, the second message and at least a fourth message distinct from the at least third message, causing the masking of that portion of the item message that is situated between its respective masking symbol and the first location, and further causing the masking of the whole of the item message when the respective masking symbol is at a second location and contacts are no longer detected.

8. The device as claimed in claim 7, wherein the device is a terminal.

9. A non-transitory computer-readable recording medium on which is recorded a computer program comprising instructions for executing a method of masking an item among a plurality of items displayed on a touchscreen terminal, wherein the method comprises following acts, following an action by a user:
- displaying, on the touchscreen of the device, a first masking symbol associated with a first message at a first location, and a second masking symbol associated with a second message at a second location, the second masking symbol being distinct from the first masking symbol, the first and second messages being situated one on each side of at least a third message, and
- detecting, by the terminal, simultaneous contacts on the touchscreen at the location of the first masking symbol and at the location of the second masking symbol,
- wherein moving continuously the masking symbols on the first and the second messages in correlation with simultaneous movement of the contact detected on the screen causes the terminal to perform, for the first message, the second message and at least a fourth message distinct from the at least third message, masking of that portion of the message that is situated between its respective masking symbol and the first location, and further causing the masking of the whole of the message when the respective masking symbol is at a second location and contacts are no longer detected.

\* \* \* \* \*